C. E. EDMUNDS.
Shaft-Tug Protector.
No. 205,789. Patented July 9, 1878.
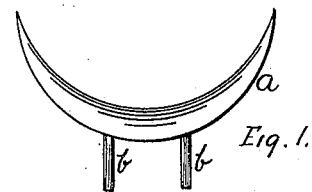

UNITED STATES PATENT OFFICE.

CHARLES E. EDMUNDS, OF EAST CORINTH, MAINE.

IMPROVEMENT IN SHAFT-LUG PROTECTORS.

Specification forming part of Letters Patent No. 205,789, dated July 9, 1878; application filed February 4, 1878.

*To all whom it may concern:*

Be it known that I, CHARLES E. EDMUNDS, of East Corinth, in the county of Penobscot and State of Maine, have invented certain new and useful Improvements in Shaft-Lug Protectors; and I do hereby declare that the following is a full, clear, and exact description thereof, that will enable others skilled in the art to which it appertains to make and use the same, reference being had to the accompanying drawings, forming a part of this specification, in which—

Figure 1 shows a side view of my invention; Fig. 2, a cross-section.

My invention consists of an improved device for protecting the shaft-lug of harnesses from the chafe of the shaft or thill of the vehicle. It is applicable to harnesses of any description, and possesses the advantages of being readily attachable and of being concealed when in use.

It will be readily understood by reference to the accompanying drawing, in which $a$ shows the device, consisting of a curved metallic guard fitting the inside of the shaft-lug, and secured by pins $b$ passing through the lug and riveting on each side of the billet. It is preferably made of malleable iron, which enables it to be bent or straightened as required for different sizes of shaft-lugs. At its center its cross-section is half-circular, or nearly so, this form giving it sufficient thickness to raise the thill from the edges of the lug, which preferably is somewhat wider than the guard $a$, concealing it when in use, and enabling it to be applied to fine grades of harness without marring their beauty.

My protector does not depend upon casing or inclosing the edges of the lug-loop for its efficiency. It operates on a different principle, its semicircular cross-section raising the shaft from contact with the loop and serving as a guard rather than as a cover, and its curved sides preventing the shaft from chafing the sides of the lug.

I do not claim a lug-protector secured by flanges extending downward over the edges of the loop, such devices rendering it necessary for the protector and loop to be of equal width in order for the loop to fit between the flanges. My protector may be applied independently of the width of the loop, it being complete in itself, and its fastening devices in no wise depending on the relative width of the loop and guard, and taste alone dictating the proportions.

What I claim as my invention is—

A shaft-lug protector, $a$, of the form herein shown and described, and having rivets $b$ formed thereon and adapted to pass through the substance of the loop, substantially as and for the purposes specified.

In testimony that I claim the foregoing I have hereunto set my hand this 30th day of January, 1878.

C. E. EDMUNDS.

Witnesses:
 JOHN R. MASON,
 WM. FRANKLIN SEAVEY.